US011989700B2

(12) United States Patent
Shao et al.

(10) Patent No.: US 11,989,700 B2
(45) Date of Patent: May 21, 2024

(54) MANAGEMENT METHODS AND MANAGEMENT INTERNET OF THINGS SYSTEMS FOR MAINTENANCE PERSONNEL OF SMART GAS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Guanghua Huang, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/181,530

(22) Filed: Mar. 9, 2023

(65) Prior Publication Data

US 2023/0214790 A1 Jul. 6, 2023

(30) Foreign Application Priority Data

Feb. 10, 2023 (CN) .......................... 202310094168.2

(51) Int. Cl.
*G06Q 10/0631* (2023.01)
*G06Q 10/20* (2023.01)
(52) U.S. Cl.
CPC ....... *G06Q 10/20* (2013.01); *G06Q 10/06311* (2013.01)
(58) Field of Classification Search
None
See application file for complete search history.

(56) References Cited

U.S. PATENT DOCUMENTS 10,445,673 B1* 10/2019 Hofmann .......... G06Q 10/06315
2014/0101058 A1* 4/2014 Castel .................... G06Q 10/20
705/305

(Continued)

FOREIGN PATENT DOCUMENTS

CN 107809456 A 3/2018
CN 110462655 A 11/2019
(Continued)

OTHER PUBLICATIONS

Notification to Grant Patent Right for Invention in Chinese Application No. 202310094168.2 dated Apr. 18. 2023, 5 pages.
(Continued)

*Primary Examiner* — Folashade Anderson
(74) *Attorney, Agent, or Firm* — METIS IP LLC

(57) ABSTRACT

The embodiments of the present disclosure provide a management method and a management Internet of Things system for a maintenance personnel of smart gas. The management method is implemented based on a smart gas safety management platform of a management Internet of Things system for maintenance personnel of smart gas. The method may include the following operations. Maintenance personnel information of at least one maintenance personnel may be obtained. The maintenance personnel information may include first positioning information of each of the at least one maintenance personnel. Second positioning information corresponding to at least one maintenance task may be obtained. A candidate maintenance task may be determined based on the first positioning information and the second positioning information. The candidate maintenance task may be sent to a user terminal of the maintenance personnel.

8 Claims, 7 Drawing Sheets

(56) References Cited

U.S. PATENT DOCUMENTS

| | | | |
|---|---|---|---|
| 2016/0132816 A1* | 5/2016 | Lush | G06Q 10/063112 |
| | | | 705/7.14 |
| 2016/0307127 A1 | 10/2016 | Katz et al. | |
| 2017/0117064 A1* | 4/2017 | Lepine | G21C 17/00 |
| 2017/0357676 A1* | 12/2017 | Santos | G06F 16/2272 |
| 2019/0080274 A1* | 3/2019 | Kovach | G06Q 10/0639 |
| 2021/0158307 A1* | 5/2021 | DeLuca | G06Q 10/06311 |
| 2022/0164747 A1* | 5/2022 | Shah | G01C 21/343 |
| 2023/0297904 A1* | 9/2023 | Cella | G06N 3/126 |
| | | | 705/7.12 |

FOREIGN PATENT DOCUMENTS

| | | |
|---|---|---|
| CN | 112465458 A | 3/2021 |
| CN | 112907388 A | 6/2021 |
| CN | 113761355 A | 12/2021 |
| CN | 114095965 A | 2/2022 |
| CN | 114510639 A | 5/2022 |
| CN | 115356978 A | 11/2022 |
| CN | 115577900 A | 1/2023 |

OTHER PUBLICATIONS

First Office Action in Chinese Application No. 202310094168.2 dated Mar. 21, 2023, 22 pages.
Su, Jian et al., Effective Application of BIM Technology in Construction Engineering Management, Urban Architecture Space, 2022, 3 pages.

\* cited by examiner

200

```
┌─────────────────────────────────────────────────────┐
│ Obtaining maintenance personnel information of at least one │
│ maintenance personnel, the maintenance personnel information │──── 210
│ including first positioning information of each of the at least one │
│ maintenance personnel │
└─────────────────────────────────────────────────────┘
                            │
                            ▼
┌─────────────────────────────────────────────────────┐
│ Obtaining second positioning information corresponding to at least │──── 220
│ one maintenance task │
└─────────────────────────────────────────────────────┘
                            │
                            ▼
┌─────────────────────────────────────────────────────┐
│ Determining a candidate maintenance task based on the first │──── 230
│ positioning information and the second positioning information │
└─────────────────────────────────────────────────────┘
                            │
                            ▼
┌─────────────────────────────────────────────────────┐
│ Sending the candidate maintenance task to a user terminal of the │──── 240
│ maintenance personnel │
└─────────────────────────────────────────────────────┘
```

```
┌─────────────────────────────────────────────────────────────┐   410
│ Determining a recommended maintenance task of the maintenance│
│        personnel based on the candidate maintenance task     │
└─────────────────────────────────────────────────────────────┘
                              │
                              ▼
┌─────────────────────────────────────────────────────────────┐   420
│ Pushing the recommended maintenance task to the user terminal of│
│                    the maintenance personnel                 │
└─────────────────────────────────────────────────────────────┘
```

FIG. 4a

MANAGEMENT METHODS AND MANAGEMENT INTERNET OF THINGS SYSTEMS FOR MAINTENANCE PERSONNEL OF SMART GAS

CROSS-REFERENCE TO RELATED APPLICATIONS

This application claims priority to Chinese Patent Application No. 202310094168.2, filed on Feb. 10, 2023, the contents of which are hereby incorporated by reference to its entirety.

TECHNICAL FIELD

The present disclosure relates to the field of gas safety, and in particular to management methods and the Internet of Things systems for a maintenance personnel of smart gas.

BACKGROUND

The use of gas is an important part of life, however, in the use of gas, it is inevitable that various failures or abnormal situations occur. Especially, for urban areas, the use of gas is relatively frequent, and the device of the pipeline network and the indoor gas device of the gas user have a relatively large operating load, resulting in that the gas failures are relatively more frequent. How to more efficiently arrange maintenance personnel to repair gas failures has become an urgent problem to be solved.

Due to the large differences in the difficulty and required cost of different maintenance tasks and uneven the personnel ability level and maintenance experience of the maintenance set, how to arrange maintenance tasks and schedule personnel in a more targeted manner to improve the quality of maintenance and save the cost of maintenance is a topic worth studying.

Therefore, it is hoped to provide a management method and an Internet of Things system for a maintenance personnel of smart gas, which helps to more effectively manage gas maintenance personnel and more targeted arrange maintenance tasks.

SUMMARY

One of the embodiments of the present disclosure provides a management method for a maintenance personnel of smart gas. The management method is implemented based on a smart gas safety management platform of a management Internet of Things system for maintenance personnel of smart gas. The method may include the following operations. Maintenance personnel information of at least one maintenance personnel may be obtained. The maintenance personnel information may include first positioning information of each of the at least one maintenance personnel. Second positioning information corresponding to at least one maintenance task may be obtained. A candidate maintenance task may be determined based on the first positioning information and the second positioning information. The candidate maintenance task may be sent to a user terminal of the maintenance personnel.

One of the embodiments of the present disclosure provides a management Internet of Things system for maintenance personnel of smart gas. The management Internet of Things system may include: a smart gas user platform, a smart gas service platform, a smart gas safety management platform, a smart gas sensor network platform, and a smart gas object platform. The smart gas object platform may be configured to obtain the gas device safety information, and transmit the gas device safety information to the smart gas safety management platform through the smart gas sensor network platform. The smart gas safety management platform may be configured to obtain maintenance personnel information of at least one maintenance personnel, the maintenance personnel information including first positioning information of each of the at least one maintenance personnel, obtain second positioning information corresponding to at least one maintenance task, determine a candidate maintenance task based on the first positioning information and the second positioning information, and send the candidate maintenance task to a user terminal of the maintenance personnel.

One of the embodiments of the present disclosure provides a non-transitory computer-readable storage medium storing a set of instructions, when executed by at least one processor, causing the at least one processor to perform the aforementioned management method for the maintenance personnel of smart gas.

BRIEF DESCRIPTION OF THE DRAWINGS

The present disclosure may be further described by way of exemplary embodiments, which may be described in detail by means of the accompanying drawings. These embodiments are not limiting, and in these embodiments, the same numbers refer to the same structures, wherein:

FIG. 2 is an exemplary flowchart of a management method for a maintenance personnel of smart gas according to some embodiments of the present disclosure;

FIG. 4a is an exemplary flowchart of a method for determining a recommended maintenance task of the maintenance personnel according to some embodiments of the present disclosure;

DETAILED DESCRIPTION

Figure 1:
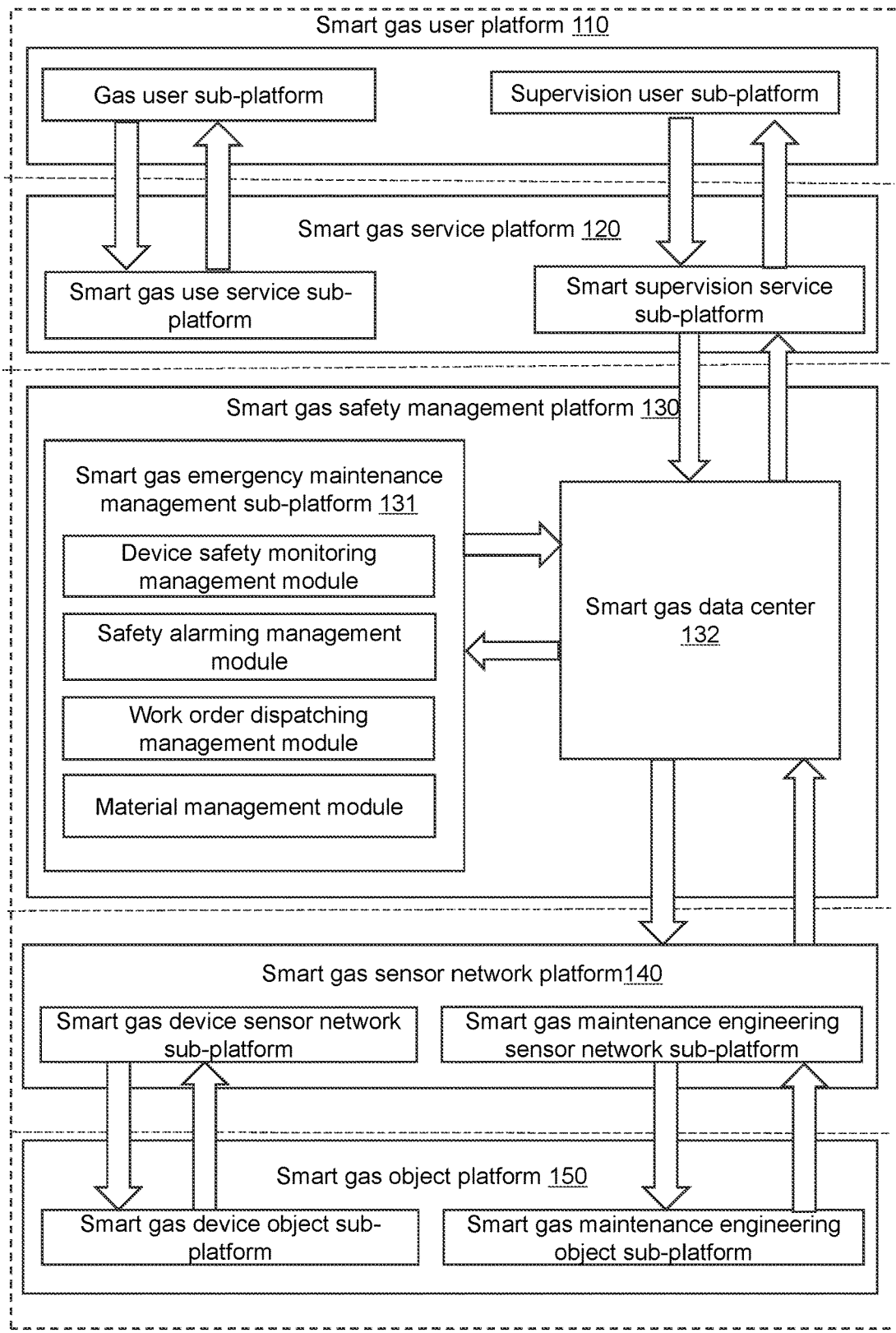
FIG. 1 is a schematic structural diagram of a management Internet of Things system for a maintenance personnel of smart gas according to some embodiments of the present disclosure.

In order to more clearly illustrate the technical solutions of the embodiments of the present disclosure, the following will briefly introduce the drawings that demand to be used in the description of the embodiments. Obviously, the drawings in the following description are only some examples or embodiments of the disclosure. For those of ordinary skill in the art, without creative work, the disclosure may be applied to other similar scenarios according to these drawings. Unless it is obvious from the language environment or otherwise stated, the same reference numbers in the drawings represent the same structure or operation.

It should be understood that the "system", "device", "unit" and/or "module" used herein is a method for distinguishing different components, elements, parts, portions, or assemblies of different levels. However, if other words may achieve the same purpose, the words may be replaced by other expressions.

As shown in the present disclosure and the claims, unless the context clearly suggests exceptional circumstances, the words "a", "an", and/or "the" do not only specifically refer to the singular form, but also include the plural form; the plural form may be intended to include the singular form as well. Generally speaking, the terms "including," "includes," "include," "comprise," "comprises," and "comprising," only suggest that the operations and/or elements that have been clearly identified are included, but these operations and/or elements do not constitute an exclusive list, and the method, system, or device may also include other operations or elements.

Flowcharts are used in the present disclosure to describe operations performed by a system according to an embodiment of the present disclosure. It should be understood that the preceding or following operations are not necessarily performed in the exact order. Instead, the various operations may be processed in reverse order or simultaneously. Also, other operations may be added to these procedures, or an operation or operations may be removed from these procedures.

FIG. 1 is a schematic structural diagram of a management Internet of Things system 100 for a maintenance personnel of smart gas according to some embodiments of the present disclosure. The following may describe in detail the management Internet of Things system 100 for a maintenance personnel of smart gas involved in the embodiment of the present disclosure. It should be noted that the following examples are only configured to explain the descriptions, and do not constitute a limitation to the description.

The Internet of Things system may be an information processing system that includes some or all of a user platform, a service platform, a management platform, a sensor network platform, and the object platform. The user platform may be a functional platform that realizes user perception information acquisition and control information generation. The service platform may realize the connection between the management platform and the user platform, and play the functions of perception information service communication and control information service communication. The management platform may realize overall planning and coordination of the connection and collaboration between various functional platforms (e.g., user platform and service platform). The management platform may gather the information of the Internet of Things operating system, and may provide perception management and control management functions for the Internet of Things operating system. The sensor network platform may be a functional platform for managing sensing communication. In some embodiments, the sensor network platform may connect the management platform and the object platform to realize the functions of sensing communication of perception information and sensing communication of control information. The object platform may be a functional platform for perception information generation.

In some embodiments, when the Internet of Things system is applied to gas management, it may be called a smart gas Internet of Things system.

In some embodiments, as shown in FIG. 1, the management Internet of Things system 100 for a maintenance personnel of smart gas (hereinafter referred to as the Internet of Things system 100) may include a smart gas user platform 110, a smart gas service platform 120, a smart gas safety management platform 130, a smart gas sensor network platform 140, and a smart gas object platform 150.

The smart gas user platform 110 may be a platform for interacting with users. The user may be a gas user, a supervision user, or the like. In some embodiments, the smart gas user platform 110 may be configured as a terminal device. For example, a terminal device may include a mobile device, a tablet computer, etc., or any combination thereof. In some embodiments, the smart gas user platform 110 may be configured to receive information and/or instructions. For example, the smart gas user platform 110 (e.g., the supervision user sub-platform) may obtain the scheduling plans for gas pipeline maintenance personnel generated by the smart gas safety management platform 130 through the terminal device. In some embodiments, the smart gas user platform 110 may send requests and/or instructions input by users to the smart gas service platform 120, and obtain the gas maintenance personnel management information fed back by the smart gas service platform 120.

In some embodiments, the smart gas user platform 110 may include a gas user sub-platform and a supervision user sub-platform. The gas user sub-platform corresponds to the smart gas use service sub-platform. For example, the gas user sub-platform may send gas usage reminder information, alarming information, etc. to gas users through the terminal device. The supervision user sub-platform corresponds to the smart supervision service sub-platform. In some embodiments, the supervision user may supervise and manage the safe operation of the Internet of Things system 100 through the supervision user sub-platform to ensure the safe and orderly operation of the Internet of Things system 100.

The smart gas service platform 120 may be a platform for communicating user needs and control information, and the smart gas service platform 120 may be connected to the smart gas user platform 110 and the smart gas safety management platform 130. The smart gas service platform 120 may obtain gas device safety information from the smart gas safety management platform 130 (e.g., the smart gas data center 132), and send the gas device safety information to the smart gas user platform 110. In some embodiments, the smart gas service platform 120 may include processing device and other components. The processing device may be a server or a server group.

In some embodiments, the smart gas service platform 120 may include a smart gas use service sub-platform and a smart supervision service sub-platform. The smart gas use service sub-platform may be a platform that provides gas service for gas users, which corresponds to the gas user sub-platform. For example, the smart gas use service sub-platform may send information such as gas bills of gas users, gas safety guidelines, and abnormal gas usage reminders to the gas user sub-platform. The smart supervision service sub-platform may be a platform that provides supervision needs for supervision users, which corresponds to the supervision user sub-platform. For example, the smart supervision service sub-platform may send the safety management information of gas device, the scheduling of gas maintenance engineering, and the maintenance information of gas device to the supervision user sub-platform.

The smart gas safety management platform 130 may refer to a platform that overall plans and coordinates the connection and cooperation between various functional platforms, gathers all the information of the Internet of Things, and provides perception management and control management functions for the Internet of Things operation system. In some embodiments, the smart gas safety management platform 130 may include processing device and other components. The processing device may be a server or a server group. In some embodiments, the smart gas pipeline network safety management platform 130 may be a remote platform controlled by users, artificial intelligence, or preset rules.

In some embodiments, the smart gas safety management platform 130 may include a smart gas emergency maintenance management sub-platform 131 and a smart gas data center 132.

The smart gas emergency maintenance management sub-platform 131 may be a platform for analyzing and processing the gas emergency maintenance management data. In some embodiments, the smart gas emergency maintenance management sub-platform 131 may perform two-way interaction with the smart gas data center 132. For example, the smart gas emergency maintenance management sub-platform 131 may obtain gas emergency maintenance management data (e.g., abnormal operation information of gas device, execution information of gas maintenance engineering) from the smart gas data center 132 for processing, and send the processing results to the smart gas data center 132.

In some embodiments, the smart gas emergency maintenance management sub-platform 131 may include but not limited to a device safety monitoring management module, a safety alarming management module, a work order dispatching management module, and a material management module.

The device safety monitoring management module may be configured to: consult historical safety data and current operation data of the smart gas object platform device. The safety alarming management module may be configured to consult or remotely process the safety alarming information uploaded by the smart gas object platform. When gas maintenance engineers are required to carry out on-site emergency maintenance, the safety alarming management module may be directly switched to the work order dispatching management module, and the work order dispatching management module may be configured to dispatch engineering maintenance personnel according to the maintenance task requirements, and confirm and check the execution progress of the maintenance engineering order, etc. The material management module may be configured to: check the material receiving personnel, category, quantity and material cost of the corresponding work order, etc.

The smart gas data center 132 may be configured to store and manage all operation information of the Internet of Things system 100. In some embodiments, the smart gas data center 132 may be configured as a storage device (e.g., a database) for storing historical and current gas device safety management data. For example, the smart gas data center 132 may store abnormal operation information of gas device, historical maintenance records, scheduled maintenance personnel, maintenance progress and other information.

In some embodiments, the smart gas safety management platform 130 may perform information interaction with the smart gas service platform 120 and the smart gas sensor network platform 140 through the smart gas data center 132, respectively. For example, the smart gas data center 132 may send the gas maintenance personnel management information to the smart gas service platform 120. For another example, the smart gas data center may send an instruction for obtaining gas device operation information to the smart gas pipeline network sensor network platform 140 (e.g., a smart gas device sensor network sub-platform), and receive the operation information of the gas device uploaded by the smart gas pipeline network sensor network platform 140. In some embodiments, the smart gas data center 132 may send the gas maintenance task to the smart gas maintenance engineering sensor network sub-platform, and feed back the maintenance task to the smart gas maintenance engineering object sub-platform through the smart gas maintenance engineering sensor network sub-platform platform to enable maintenance engineering implementation.

The smart gas sensor network platform 140 may be a functional platform for managing sensing communication. In some embodiments, the smart gas sensor network platform 140 may connect the smart gas safety management platform 130 and the smart gas object platform 150 to realize the functions of perception information sensing communication and control information sensing communication.

In some embodiments, the smart gas sensor network platform 140 may include a smart gas device sensor network sub-platform and a smart gas maintenance engineering sensor network sub-platform. The smart gas device sensor network sub-platform corresponds to the smart gas device object sub-platform, and the smart gas maintenance engineering sensor network sub-platform corresponds to the smart gas maintenance engineering object sub-platform.

In some embodiments, the smart gas device sensor network sub-platform may send the operation information of the gas device (e.g., the abnormal information of the gas device) uploaded by the smart gas device object sub-platform to the smart gas data center 132. The smart gas maintenance engineering sensor network sub-platform may send the related information (e.g., the progress of the maintenance engineering) of the maintenance engineering uploaded by the smart gas maintenance engineering object sub-platform to the smart gas data center 132.

The smart gas object platform 150 may be a functional platform for generating perceptual information. For example, the smart gas object platform 150 may monitor and generate operation information (e.g., abnormal information of gas pipelines) of the gas device, and upload the operation information to the smart gas data center 132 through the smart gas pipeline network sensor network platform 140.

In some embodiments, the smart gas object platform 150 may include a smart gas device object sub-platform and a smart gas maintenance engineering object sub-platform.

In some embodiments, the smart gas device object sub-platform may be configured as various types of gas device and monitoring device. For example, the gas device may include indoor gas device (e.g., gas meters for gas users) and pipeline network device (e.g., gas pipelines, valve control device, gas storage tanks), etc. The monitoring device may include gas flow meters, pressure sensors, temperature sensors, etc. In some embodiments, the smart gas device object sub-platform may obtain the operation information and monitoring information of the gas device, and send the operation information and monitoring information to the smart gas data center 132 through the smart gas device sensor network sub-platform. In some embodiments, the smart gas device object sub-platform may also include a positioning device, which may upload the positioning information of the device that fails or operates abnormally to the smart gas data center through the smart gas device sensor network sub-platform.

In some embodiments, the smart gas pipeline network maintenance engineering object sub-platform may include various types of maintenance device, etc. For example, smart gas pipeline network maintenance engineering object sub-platform may include engineering maintenance sets, maintenance vehicles, maintenance tools, alarming devices, etc. In some embodiments, the smart gas pipeline network maintenance engineering object sub-platform may receive the maintenance tasks issued by the smart gas data center 132 through the smart gas maintenance engineering sensor network sub-platform and perform the maintenance tasks. At the same time, the smart gas maintenance engineering object sub-platform may upload the execution situation (e.g., progress of maintenance engineering) of the maintenance engineering to the smart gas data center 132 through the smart gas maintenance engineering sensor network sub-platform.

Based on the management Internet of Things system 100 for a maintenance personnel of smart gas, some embodiments of the present disclosure may form a closed-loop operation of smart gas emergency maintenance management information among indoor device, maintenance engineering personnel, gas operators, and gas users to realize emergency maintenance management informatization and intelligence, and ensure effective management.

It should be noted that the above Internet of Things system 100 is provided for the purpose of illustration only, and is not intended to limit the scope of the descriptions. For those skilled in the art, various modifications or changes may be made according to the descriptions in the present disclosure. For example, the Internet of Things system 100 may also include one or more other suitable components to achieve similar or different functions. However, changes and modifications do not depart from the scope of the present disclosure.

FIG. 2 is an exemplary flowchart of a management method for a maintenance personnel of smart gas according to some embodiments of the present disclosure.

In some embodiments, the process 200 may be executed by the smart gas safety management platform 130. As shown in FIG. 2, the process 200 may include the following operations.

In operation 210, obtaining maintenance personnel information of at least one maintenance personnel, the maintenance personnel information including first positioning information of each of the at least one maintenance personnel.

The maintenance personnel may refer to staff assigned to perform maintenance tasks in the maintenance set, for example, staff who check gas leaks, staff who replace gas device parts or pipelines, etc.

The maintenance personnel information may refer to the information relevant to the maintenance personnel, and the maintenance personnel information may include basic information of the maintenance personnel, for example, the name, job number, length of service, telephone of the maintenance personnel, etc. The maintenance personnel information may also include historical maintenance information, for example, maintenance years, specialized maintenance fields (e.g., pipeline maintenance, gas meter maintenance), customer evaluation information, etc. The maintenance personnel information may be stored in the smart gas data center in the form of files, data tables, etc. In some embodiments, the smart gas safety management platform 130 may obtain maintenance personnel information from the smart gas data center and perform corresponding analysis and processing.

In some embodiments, the maintenance personnel information may also include first positioning information. The first positioning information may refer to the current positioning information of the maintenance personnel. The first positioning information may be the maintenance engineering station to which the maintenance personnel belong. For example, the first positioning information of the maintenance personnel may be the maintenance station A1 of area A in the city. In some embodiments, the first positioning information may also be real-time geographic positioning information of maintenance personnel. For example, the smart gas safety management platform 130 may obtain real-time positioning information of maintenance personnel through a positioning device (e.g., a GPS device of a smart phone).

In operation 220, obtaining second positioning information corresponding to at least one maintenance task.

The maintenance task may refer to an operation that requires maintenance personnel to rescue or repair gas-related failures. The maintenance task may include maintenance tasks of indoor device, maintenance tasks of pipeline network device, or the like. In some embodiments, the maintenance task may be determined based on the gas failure information reported by the gas user, for example, indoor gas meter failures, gas consumption failures, and aging pipelines reported by gas users. The maintenance tasks may also be determined based on abnormal information on the operation of gas device (e.g., gas pipelines, valve control device, and gas compressors) obtained by gas monitoring device (e.g., gas flow meters and pressure sensors) on the smart gas device object sub-platform, for example, damage to gas pipelines in the gas pipeline network, gas leakage, etc.

The information of the maintenance task may include the types of the maintenance task, for example, indoor maintenance task type, pipeline network maintenance task type. The types of the maintenance task may also be determined based on the type of device to be maintained, for example, gas meters, gas pipelines, gas compressors, gas storage tanks, etc. Correspondingly, the types of maintenance task may be gas meter maintenance tasks, gas pipeline maintenance tasks, or the like. The maintenance task information may also include maintenance difficulty of the maintenance task. The maintenance difficulty may be determined based on a preset difficulty coefficient. For example, maintenance tasks of different maintenance task types may be evaluated based on experience, and a difficulty coefficient in the interval [0, 1] may be set. The larger the value of the difficulty coefficient is, the more difficult the maintenance task is. The maintenance task information may also include other information, for example, the maintenance task information may include the number of maintenance personnel required for the maintenance task, the capability requirements of the maintenance personnel, or the like.

In some embodiments, the maintenance task information may further include second positioning information. The second positioning information may refer to a target position where maintenance personnel need to go to perform maintenance tasks, for example, the home address of the gas user, the position of a gas pipeline that needs to be repaired, the position of a failed gas storage tank, etc.

In some embodiments, the second positioning information may be determined based on positioning information reported by gas users or gas inspection personnel, for example, the address reserved by ordinary residential gas users. The second positioning information may also be determined based on the positioning information of the failure point automatically uploaded by the smart gas device object sub-platform. More descriptions of the relevant content of the smart gas device object sub-platform reference may be found in FIG. 1 and its descriptions.

In some embodiments, the smart gas safety management platform 130 may determine a plurality of different maintenance tasks based on preset rules. Exemplarily, the smart gas safety management platform 130 may determine a plurality of maintenance tasks with different types, different maintenance difficulties, and different numbers of people according to the maintenance task information.

In operation 230, determining a candidate maintenance task based on the first positioning information and the second positioning information.

The candidate maintenance tasks may refer to maintenance tasks to be assigned to corresponding maintenance personnel. Different maintenance tasks have different requirements for maintenance personnel (e.g., distance, ability level, etc.), and correspondingly, the number of candidate maintenance tasks and candidate maintenance tasks assigned to different maintenance personnel may also be different. For example, for 10 maintenance tasks corresponding to 10 gas failures in a certain area, for a certain maintenance personnel, the candidate maintenance tasks may be one or more of the 10 maintenance tasks.

In some embodiments, the smart gas safety management platform 130 may determine candidate maintenance tasks according to the first positioning information and the second positioning information. Exemplarily, for one of the multiple maintenance tasks, the position corresponding to the second positioning information of the maintenance task may be used as the center of the circle, and the circular range may be determined based on a preset radius (e.g., 1 km). When one or more pieces of first positioning information belong to the circular range, that is, there are maintenance personnel in the circular range, then the maintenance task may be determined as a candidate maintenance task for the maintenance personnel in the circular range.

It should be noted that the preset radius may be adjusted based on actual conditions. For example, for areas where maintenance personnel are relatively concentrated (e.g., urban areas), the preset radius may be small (e.g., 500 m), and for areas where maintenance personnel are relatively sparse (e.g., suburban areas), the preset radius may be large (e.g., 2 km). It may be understood that the smart gas safety management platform 130 may search or match the first positioning information (maintenance personnel) based on the second positioning information of the maintenance task and the preset radius. When one or more maintenance personnel are matched, the maintenance task may be determined as a candidate maintenance task for the matched maintenance personnel. As an example, the smart gas safety management platform 130 may also search or match the second positioning information based on the first positioning information and the preset radius to determine the candidate maintenance tasks of the candidate maintenance personnel, which is not limited in the present disclosure.

In some embodiments, the smart gas safety management platform 130 may determine the maintenance cost scores of a plurality of maintenance personnel based on the cost prediction model, and determine the candidate maintenance tasks for each maintenance personnel based on the maintenance cost scores. More descriptions may be found in FIG. 3a and its descriptions.

In operation 240, sending the candidate maintenance task to a user terminal of the maintenance personnel.

In some embodiments, the smart gas safety management platform 130 may send the candidate maintenance tasks to the user terminal of the corresponding maintenance personnel. The user terminal may be an information receiving device (e.g., a mobile phone, a broadcasting device, and an alarming device) for maintenance personnel. Exemplarily, the smart gas safety management platform 130 may obtain the maintenance task information of candidate maintenance tasks, and send different candidate maintenance tasks to the smart gas maintenance engineering object sub-platform through the smart gas maintenance engineering sensor network sub-platform, and the maintenance personnel of the corresponding maintenance engineering may receive candidate maintenance task information through the user terminal, and then may perform rescue and maintenance operations based on the candidate maintenance task information.

In some embodiments of the present disclosure, the first positioning information of the maintenance task and the second positioning information of the maintenance personnel may help to quickly match the candidate maintenance tasks corresponding to the maintenance personnel, and may realize the rapid response of the maintenance task.

Figure 3A:
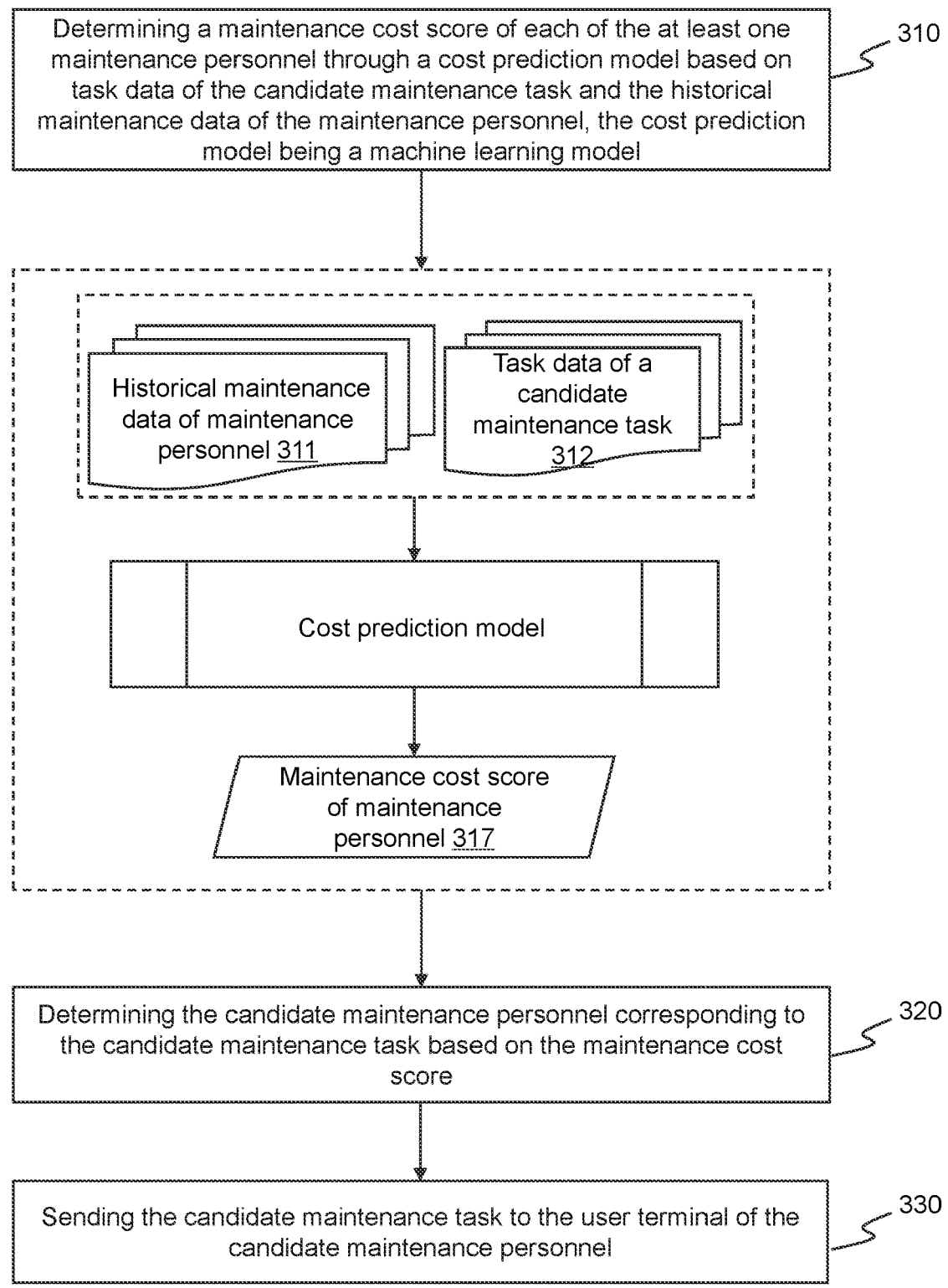
FIG. 3a is an exemplary flowchart of a method for determining candidate maintenance personnel corresponding to a candidate maintenance task according to some embodiments of the present disclosure.

FIG. 3a is an exemplary flowchart of a method for determining candidate maintenance personnel corresponding to a candidate maintenance task according to some embodiments of the present disclosure.

In some embodiments, the process 300 may be executed by the smart gas safety management platform 130. As shown in FIG. 3a, the process 300 includes the following operations.

In operation 310, determining a maintenance cost score of each of the at least one maintenance personnel through a cost prediction model based on task data of the candidate maintenance task and the historical maintenance data of the maintenance personnel, the cost prediction model being a machine learning model.

The task data of the candidate maintenance task may include data such as the types of the maintenance task and the difficulty of maintenance. More information, reference may be found in the maintenance task information and its descriptions in FIG. 2.

The historical maintenance data may be configured to represent the execution situation of historical maintenance tasks of a maintenance personnel. For example, historical maintenance data may include historical maintenance times of maintenance personnel, durations of each maintenance, types of maintenance task, maintenance difficulty, or the like. In some embodiments, the historical maintenance data of the maintenance personnel may be determined based on the task data of the plurality of historical maintenance tasks of the maintenance personnel and the results of executions of the historical maintenance tasks.

In some embodiments, the historical maintenance data of maintenance personnel also includes customer feedback information. The customer may be a gas user (e.g., an industrial gas user, an ordinary gas user). The customer feedback information may represent the quality of the results after the maintenance personnel perform maintenance tasks. The customer feedback information may include, but is not limited to, customer evaluation information (e.g., text evaluation), image information (e.g., uploaded maintenance result images), or the like.

The feedback information may also include customer satisfaction. The satisfaction may be a numerical value in the interval [0, 10], and the larger the numerical value is, the more satisfied the customer is. It is understandable that after the maintenance personnel complete the maintenance task, the customer feedback information (e.g., satisfaction) may also be determined as an evaluation index for the maintenance personnel's subsequent assignment of maintenance tasks. Exemplarily, if the maintenance personnel perform a certain type of maintenance task, and the satisfaction of customer feedback is high, it may indicate that the maintenance personnel have a better processing effect on the type of maintenance task, and the probability of subsequently assigning the type of maintenance task to the maintenance personnel is greater.

Some embodiments of this disclosure, in combination with the customer feedback information, the historical maintenance data of the maintenance personnel may reflect the execution situation of the maintenance tasks of the maintenance personnel, and help to further evaluate the maintenance ability level of the maintenance personnel more reasonably.

The maintenance cost score may represent the maintenance cost required by the maintenance personnel to perform the maintenance task. It may represent the consumption of manpower, material resources, time, etc. The maintenance cost score may be a value in the interval [0,1], for example, 0.6, and the larger the value is, the higher the cost that needs to be consumed is.

In some embodiments, the smart gas safety management platform 130 may determine the maintenance cost score of each maintenance personnel through the cost prediction model. The cost prediction model may be a trained machine learning model. For example, the cost prediction model may include Deep Neural Networks (DNN) model, Recurrent Neural Networks (RNN) model, Convolutional Neural Networks (CNN) model, or other custom model structures, or any one or combination thereof.

In some embodiments, as shown in FIG. 3a, the smart gas safety management platform 130 may input the historical maintenance data 311 of the plurality of maintenance personnel and the task data 312 of the plurality of candidate maintenance tasks into the cost prediction model and output maintenance cost score 317 of maintenance personnel based on the cost prediction model. More descriptions of the candidate maintenance task, reference may be found in FIG. 2 and its descriptions.

The maintenance cost score of the maintenance personnel output by the cost prediction model may refer to the maintenance cost score of each maintenance personnel for each candidate maintenance task. In some embodiments, the maintenance cost score may be represented in the form of a cost vector matrix as follows:

$$\begin{bmatrix} t1 & 0.2 & 0.5 & 0.6 & 0.1 \\ t2 & 0.4 & 0.5 & 0.3 & 0.3 \\ t3 & 0.8 & 0.5 & 0.6 & 0.7 \\ t4 & 0.1 & 0.1 & 0.1 & 0.2 \end{bmatrix}$$

The number of rows of cost vector matrix may be equal to the number of candidate maintenance task, each row represents a candidate maintenance task, and for the candidate maintenance task, the maintenance cost score of each maintenance personnel, each column represents the value of the predicted specific cost score for a maintenance personnel to perform each candidate maintenance task. Exemplarily, in the first row (t1, 0.2, 0.5, 0.6, 0.1), the first element represents the candidate maintenance task a, and the second to fifth elements represent the maintenance cost scores of the current four maintenance personnel for the candidate maintenance task t1 are 0.2, 0.2, 0.5, 0.6, 0.1, respectively. Similarly, the second row represents the maintenance cost scores of the four maintenance personnel for the candidate maintenance task t2 are 0.4, 0.5, 0.4, 0.3, and 0.3, respectively, and so forth.

In some embodiments, the cost prediction model may be obtained by training a plurality sets of first training samples with the first cost label. Each set of training samples of the first training samples may include task data of a plurality of historical sample candidate maintenance tasks and historical maintenance data of a plurality of maintenance personnel. The first cost label may be determined based on the actual maintenance cost score of each sample maintenance personnel performing the sample candidate maintenance tasks in the set of training samples. The first cost label may be marked manually or other ways.

When training the initial cost prediction model, the smart gas safety management platform 130 may input each set of first training samples into the initial cost prediction model, and output the cost score of the maintenance personnel based on the processing of the initial cost prediction model. The smart gas safety management platform 130 may construct a loss function based on the first cost label of each set of first training samples and the output of the initial cost prediction model, and iteratively update the parameters of the initial cost prediction model based on the loss function until the preset conditions are satisfied and the training is completed, and obtain the trained initial cost prediction model. The preset condition may be that the loss function is less than the threshold, converges, or the training cycle reaches the threshold.

Figure 3B:
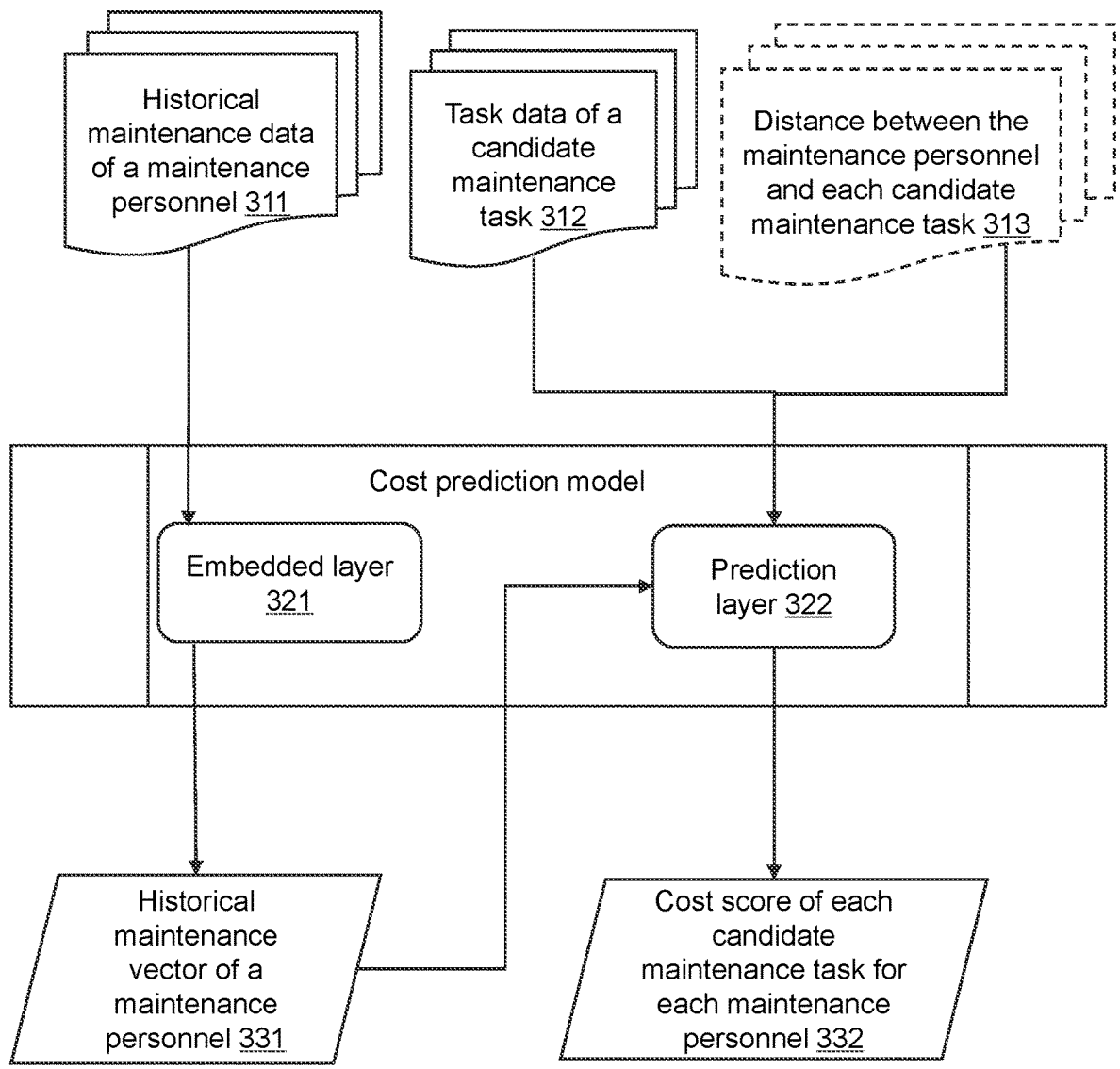
FIG. 3b is an exemplary schematic diagram of a cost prediction model according to some embodiments of the present disclosure.

FIG. 3b is an exemplary schematic diagram of a cost prediction model according to some embodiments of the present disclosure;

In some embodiments, as shown in FIG. 3b, the cost prediction model may include an embedded layer and a prediction layer. The historical maintenance data of the maintenance personnel may be processed to determine the historical maintenance vector of the maintenance personnel based on the embedded layer. The historical maintenance vector and the task data of maintenance tasks are processed to determine the maintenance cost score of the maintenance personnel based on the prediction layer.

The historical maintenance vector may be configured to represent the maintenance situation of a certain historical maintenance task of the maintenance personnel. Exemplarily, the historical maintenance vector may be represented by a vector (a, b, c, d), the first element to the fourth element of the vector respectively represents the type of maintenance task, the duration of the maintenance task, the maintenance difficulty, satisfaction of customer feedback. It may be understood that a maintenance person may have a plurality of historical maintenance tasks, and correspondingly, the historical maintenance data of the plurality of historical maintenance tasks of the maintenance personnel may be represented by the maintenance vector matrix as shown below:

$$\begin{bmatrix} a1 & b1 & c1 & d1 \\ a2 & b2 & c2 & d2 \\ a3 & b3 & c3 & d3 \end{bmatrix}$$

For a certain maintenance personnel, the number of rows of the maintenance vector matrix represents the number of historical maintenance tasks of the maintenance personnel, and each row represents a historical maintenance vector corresponding to one of the historical maintenance tasks.

In some embodiments, as shown in FIG. 3b, the smart gas safety management platform 130 may input the historical maintenance data 311 of a plurality of maintenance personnel into the embedded layer 321, output the historical maintenance vector 331 of each maintenance personnel based on the processing of the embedded layer 321. It should be noted that the historical maintenance vector 331 here may refer to the representation of the aforementioned maintenance vector matrix.

In some embodiments, the embedded layer may be obtained by training with a plurality sets of first training samples with the second label. The second label may be determined based on the historical maintenance vectors of the maintenance personnel constructed from the historical data of each set of maintenance personnel in each set of first training samples, which may be marked manually, or the like.

When training the embedded layer, the smart gas safety management platform 130 may input each set of first training samples into the embedded layer to obtain the historical maintenance vector of the maintenance personnel. More descriptions of the training method of the embedded layer, reference may be found in the training method of the aforementioned cost prediction model, and may not repeat it here.

In some embodiments, as shown in FIG. 3b, the smart gas safety management platform 130 may input the historical maintenance vector 331 of the maintenance personnel and the task data 312 of the candidate maintenance task to the prediction layer 322, and output the cost score 332 of each candidate maintenance task for each maintenance personnel based on the processing of the prediction layer 322.

In some embodiments, the prediction layer may be obtained by training a plurality sets of second training samples with the first cost label. The second training samples may include historical maintenance vectors of the plurality sets of maintenance personnel and task data of candidate maintenance tasks. The historical maintenance vector of each set of maintenance personnel may be constructed based on the historical data of each set of maintenance personnel in the first training sample, and the label of the set of training samples may be the first cost label corresponding to the corresponding first training sample. In this way, manpower and time costs caused by setting the second training samples and corresponding training labels may be reduced, and training efficiency may be improved. The first cost labels may be marked manually, or other ways.

When training the prediction layer, the smart gas safety management platform 130 may input each set of second training samples into the prediction layer to obtain the cost score of each candidate maintenance task for each maintenance personnel. More descriptions of the training method of the prediction layer, reference may be found in the training method of the aforementioned cost prediction model, which may not be repeated here.

In some embodiments, the input of the prediction layer may also include the distance between each maintenance task and each maintenance personnel (referred to as task distance herein). Each input sample task distance corresponds to the distance between the maintenance personnel in the historical maintenance vector 331 of the maintenance personnel and the maintenance tasks in the task data 312 of candidate maintenance tasks.

The task distance may be determined based on the first positioning information and the second positioning information. Exemplarily, the smart gas safety management platform 130 may calculate the straight-line distance between the first positioning information and the second positioning information to determine the task distance. In some embodiments, the smart gas safety management platform 130 may also determine the task distance using the map (such as an electronic map) based on taking the first location (e.g., coordinates) corresponding to the first positioning information as the starting point and the second location corresponding to the second positioning information as the destination, and the length of the route (such as walking force and driving path) from the starting point to the destination.

As shown in FIG. 3b, the smart gas safety management platform 130 may input the historical maintenance vector 331 of the maintenance personnel, the task data 312 of the candidate maintenance tasks, the distance 313 between the maintenance personnel and each candidate maintenance task to the prediction layer 322, and output a cost score 332 of each candidate maintenance task for each maintenance personnel based on the processing of the prediction layer 322.

When training the prediction layer, the second training sample of the prediction layer may also include a plurality sets of sample task distances, and the training labels of the prediction layer may be the second cost label. The task distance of each set of samples may be the distance between the maintenance tasks in each set of second training samples and each maintenance personnel. The second cost label may be the historical maintenance cost of each maintenance personnel actually performing the candidate maintenance tasks in the set of training samples. The second cost label may be marked manually, or other ways. More descriptions of the training method of the prediction layer, reference may be found in the training method of the aforementioned cost prediction model, which may not be repeated here.

It should be noted that the second cost label may be different from the first cost label. In the case of introducing task distance, the cost brought by the task distance may be considered, for example, transportation cost, time cost, etc. The cost score of the maintenance personnel determined by the prediction layer may be more precise.

Some embodiments of the present disclosure, it is considered that distance factor is used as the input of cost prediction model (e.g., prediction layer), making cost prediction model output result more conform to actual situation, which helps to improve the prediction accuracy of the cost prediction model.

In some embodiments, the embedded layer and the prediction layer may be obtained through joint training based on multiple sets of first training samples with training labels. The training label may be the first cost label. When the first training sample includes the sample task distance when training the prediction layer, the training label may be the corresponding second cost label. The training labels may be marked manually or other ways.

When the embedded layer and the prediction layer are performed joint training, the smart gas safety management platform 130 may input every set of first training sample into embedded layer to obtain the historical maintenance vector of maintenance personnel, and input the historical maintenance vector of the maintenance personnel as a training sample into the prediction layer to obtain the cost score of the maintenance personnel. The smart gas safety management platform 130 may construct a loss function based on the training labels corresponding to each set of first training samples and the output of the prediction layer, iteratively update the parameters of the embedded layer and the prediction layer based on the loss function until the preset conditions are satisfied and the training is completed, and obtain the trained embedded layer and the prediction layer and the prediction layer. The preset condition may be that the loss function is less than a threshold, converges, or the training period reaches the threshold.

In some embodiments of the present disclosure, by using the cost prediction model, it may predict the maintenance cost score of each maintenance task relative to different maintenance personnel based on the historical data of the maintenance personnel and the current maintenance task data relatively quickly, and then push the maintenance tasks to the target maintenance personnel in a more targeted manner.

In operation 320, determining the candidate maintenance personnel corresponding to the candidate maintenance task based on the maintenance cost score.

The candidate maintenance personnel may refer to one or more alternative maintenance personnel that match the candidate maintenance tasks. For example, the number of current maintenance personnel is 20, and the candidate maintenance personnel of a certain candidate maintenance task may be 5 maintenance personnel among the current maintenance personnel.

In some embodiments, the smart gas safety management platform 130 may determine the candidate maintenance personnel corresponding to each candidate maintenance task based on each candidate maintenance task and the maintenance cost scores of multiple maintenance personnel for the candidate maintenance task. Exemplarily, the cost score threshold may be preset, for example, 0.5. For a certain candidate maintenance task, the smart gas safety management platform 130 may determine the maintenance personnel whose maintenance cost score is less than the cost score threshold as the candidate maintenance personnel corresponding to the candidate maintenance task In operation 330, sending the candidate maintenance task to the user terminal of the candidate maintenance personnel.

In some embodiments, the smart gas safety management platform 130 may send the candidate maintenance tasks whose cost scores are less than the cost score threshold (e.g., 0.5) to the user terminal of the corresponding candidate maintenance personnel. More descriptions may be found in FIG. 2 and its descriptions.

In some embodiments of the disclosure, the candidate maintenance personnel corresponding to each maintenance task may be determined by the maintenance cost score, and the maintenance tasks may be assigned in combination with the maintenance cost of the maintenance personnel, which helps to reduce the consumption of manpower, material resources, time and other resources required for follow-up maintenance.

FIG. 4a is an exemplary flowchart of a method for determining a recommended maintenance task of the maintenance personnel according to some embodiments of the present disclosure.

In some embodiments, process 400 may be executed by the smart gas safety management platform 130. As shown in FIG. 4a, the process 400 may include the following operations.

In operation 410, determining a recommended maintenance task of the maintenance personnel based on the candidate maintenance task.

The recommended maintenance task may refer to a candidate maintenance task that is more suitable for the maintenance personnel, that is, a candidate maintenance task that is more suitable for the maintenance personnel to perform. For example, the maintenance personnel A has 5 current candidate maintenance tasks, and the type and difficulty of one of the candidate maintenance tasks is more suitable for the maintenance personnel A than the other 4 candidate maintenance tasks, then the candidate maintenance task may be the recommended maintenance task of maintenance personnel A. It should be noted that the recommended maintenance task may include, but is not limited to, one or multiple. For example, among the aforementioned five candidate maintenance tasks, the recommended maintenance tasks may be two, three, etc. among the candidate maintenance tasks.

In some embodiments, the smart gas safety management platform 130 may determine the recommended maintenance tasks for each maintenance personnel based on modeling or various analysis methods. For example, the historical maintenance data of each maintenance personnel may be analyzed, and the type and difficulty of maintenance tasks within the scope of maintenance capabilities corresponding to each maintenance personnel may be counted, and the maintenance tasks that match their maintenance capabilities among the current plurality of maintenance tasks may be selected as recommended maintenance tasks.

Figure 4B:
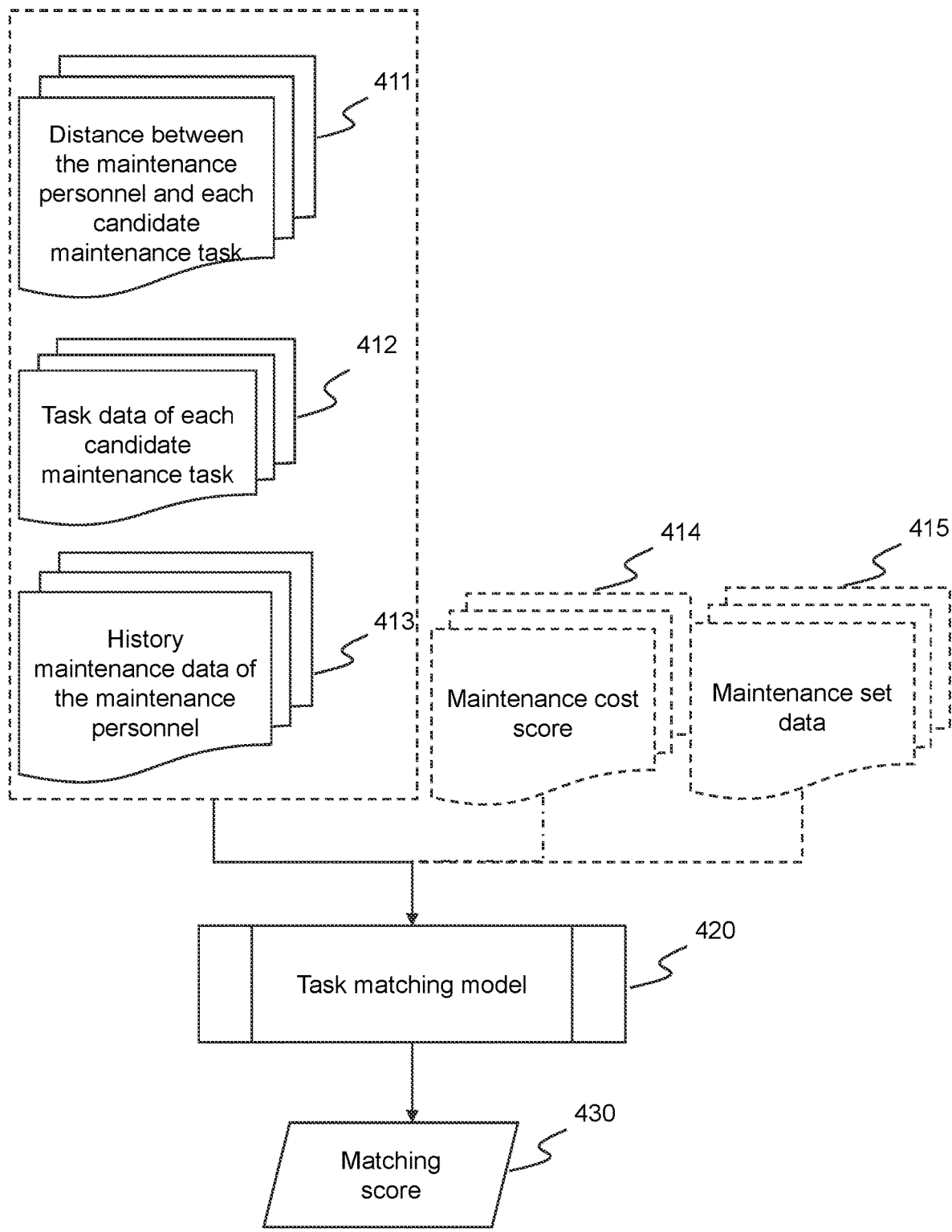
FIG. 4b is an exemplary schematic diagram of a task matching model according to some embodiments of the present disclosure.

FIG. 4b is an exemplary schematic diagram of a task matching model according to some embodiments of the present disclosure.

In some embodiments, as shown in FIG. 4b, the smart gas safety management platform 130 may determine the matching score of each candidate maintenance task with the maintenance personnel through the task matching model based on the distance between the maintenance personnel and each candidate maintenance task, the task data of each of the candidate maintenance tasks and the history maintenance data of the maintenance personnel, and determine the recommended maintenance tasks for each maintenance personnel based on the matching scores.

A task matching model may refer to a model for determining recommended maintenance tasks for maintenance personnel. In some embodiments, the task matching model may be a trained machine learning model, for example, the task matching model may include a deep neural network (DNN) model, a recurrent neural network (RNN), a convolutional neural network (CNN) model, or other custom model structures, or any combination thereof.

In some embodiments, as shown in FIG. 4b, the smart gas safety management platform 130 may input the distance 411 between the maintenance personnel and each candidate maintenance task, the task data 412 of each candidate maintenance task and the history maintenance data 413 of the maintenance personnel into the task matching model 420, and determine a matching score 430 of each candidate maintenance task and maintenance personnel based on the processing of the task matching model 420.

The matching score of a certain candidate maintenance task and a certain maintenance personnel may be a value in the interval [0, 10], and the larger the value is, the more the candidate maintenance task matches the maintenance personnel is.

The matching score of each candidate maintenance task and maintenance personnel output by the task matching model may represent the matching score between each candidate maintenance task in a plurality of candidate maintenance tasks and a plurality of maintenance personnel. In some embodiments, the matching score output by the task matching model may be expressed in the form of a score vector matrix as shown below:

$$\begin{bmatrix} a & 3 & 5 & 6 & 1 \\ b & 4 & 6 & 3 & 3 \\ c & 8 & 5 & 6 & 7 \\ d & 1 & 1 & 1 & 2 \end{bmatrix}$$

The number of rows of the score vector matrix may be equal to the number of candidate maintenance tasks, each row represents a candidate maintenance task and the matching scores of each maintenance personnel and the candidate maintenance task. Exemplarily, in the first row (a, 3, 5, 6, 1), the first element may represent the candidate maintenance task "a", and the second element to fifth element may represent that the matching scores of the current four maintenance personnel for the candidate maintenance task "a" are 3, 2, 5, 6, and 1, respectively. Similarly, the second row may represent the matching scores of the four maintenance personnel for the candidate maintenance task "b" are 4, 6, 4, 3, and 3, respectively, and so forth. It may be understood that the score vector matrix may indicate: for a plurality of candidate maintenance tasks, the matching score of each maintenance personnel among all maintenance personnel and each candidate maintenance task.

In some embodiments, the task matching model may be obtained through training a plurality sets of third training samples with the first score label. Each set of the third training samples may include the distance between the maintenance personnel and each candidate maintenance task and the task data of each candidate maintenance task. The first score label may be determined based on the actual matching scores between each candidate maintenance task and each maintenance personnel in the set of third training samples. For example, type, difficulty, maintenance experience requirements, etc. of the sample candidate maintenance task may be determined based on the task data of the candidate maintenance task, and after evaluating each actual maintenance personnel, the matching score of the maintenance personnel for the candidate maintenance task may be determined. Correspondingly, for a plurality of candidate maintenance tasks in each set of third training samples, the first score labels of the candidate maintenance task may be expressed in matrix form of matching scores. Exemplarily, the number of rows of the first score label may be determined based on the number of candidate maintenance tasks of each set of the third training sample (each set of third training samples may include 5 candidate maintenance tasks, then the number of rows is 5), the number of columns of the first score label may be determined based on the preset number of maintenance personnel (e.g., if the total number of maintenance personnel in the maintenance set is 20, the number of columns may be 21, the first element of each row is the identifier of a candidate maintenance task). The first score label may be marked based on manually or other methods.

When training the initial task matching model, the smart gas safety management platform 130 may input each set of third training samples into the task matching model. Through the processing of the task matching model, the matching score of each candidate maintenance task and the maintenance personnel may be output. The smart gas safety management platform 130 may construct a loss function based on the first score label of each set of third training samples and the output of the task matching model, and iteratively update the parameters of the task matching model based on the loss function until the preset conditions are satisfied and the training is completed, and the trained task matching model may be obtained. The preset condition may be that the loss function is smaller than a threshold, converges, or the training period reaches the threshold.

In some embodiments, the input of the task matching model may also include a maintenance cost score. The maintenance cost score may be determined based on a cost prediction model. More descriptions of the relevant content of the cost prediction model, reference may be found in FIG. 3a and its descriptions.

In some embodiments, as shown in FIG. 4b, the smart gas safety management platform 130 may input the distance 411 between the maintenance personnel and each candidate maintenance task, the task data 412 of each candidate maintenance task, and the history maintenance data 413 of the maintenance personnel and the maintenance cost score 414 into the task matching model 420, and determine a matching score 430 for each candidate maintenance task and maintenance personnel based on the processing of the task matching model 420.

In some embodiments, when training the task matching model, the third training sample may also include a sample maintenance cost score. The label of each set of third training samples may be a second score label. Exemplarily, on the basis of the first score label, combined with the sample cost scores of each maintenance personnel corresponding to each sample candidate maintenance task, a manual evaluation of the matching score may be performed, and then the first score label may be adjusted to determine the second score label. It can be understood that after the maintenance cost score is introduced, the output matching score result of the task matching model may be more accurate, and the second score label may be adjusted accordingly. The second score label may be marked manually or other ways.

When training the initial task matching model, the smart gas safety management platform 130 may input each set of third training samples with the second score label into the task matching model. Through the processing of the task matching model, the matching score of each candidate maintenance task and the maintenance personnel may be output. More descriptions of the training method of the task matching model, reference may be found in the training method of the task matching model above, and not be repeated here.

In some embodiments, the input of the task matching model may also include maintenance set data, and the maintenance set data may include the number of maintenance personnel required by each maintenance task, the number of matched maintenance personnel for the current maintenance task, and the maintenance cost score of the matched maintenance personnel.

As shown in FIG. 4b, the smart gas safety management platform 130 may input the distance 411 between the maintenance personnel and each candidate maintenance task, the task data 412 of each candidate maintenance task, the maintenance cost score 414 and the maintenance set data 415 into the task matching model 420, and determine a matching score 430 of each candidate maintenance task and maintenance personnel based on the processing of the task matching model 420.

It should be noted that for different maintenance tasks, the number of maintenance personnel required may be different, and a plurality of maintenance personnel may form a maintenance set. The number of maintenance personnel in the maintenance set may be determined based on types, difficulty, etc. of different maintenance task, maintenance. For example, for a maintenance task with high maintenance difficulty (e.g., the maintenance difficulty coefficient greater than 0.5), at least n (n greater than or equal to 2) maintenance personnel are required to participate in the maintenance operation, and the n maintenance personnel may form a maintenance set. More descriptions of the maintenance difficulty, reference may be found in FIG. 2 and its descriptions.

In some embodiments, the distribution of the ability value and experience value of the personnel in the maintenance set may be considered, and candidate maintenance personnel with rich experience and high ability value may be combined with maintenance personnel who are relatively inexperienced and need to improve their ability value, the maintenance personnel in the maintenance set may be guided to improve the maintenance ability level of the entire maintenance set.

It should be noted that the comprehensive evaluation of the ability value and experience value of maintenance personnel may be determined based on the cost score of maintenance personnel. For example, for a maintenance task that requires the participation of a maintenance set, the smart gas safety management platform 130 may obtain the cost scores of a plurality of maintenance personnel currently matched with the maintenance task and the cost score of each maintenance personnel among the plurality of the maintenance personnel to be matched. When the average cost score of the entire maintenance set composed of the matched maintenance personnel and the maintenance personnel to be matched is within the cost threshold range of the maintenance set, the higher the matching score of the aforementioned maintenance personnel to be matched is, the easier the maintenance personnel to be matched is to be assigned to maintenance set.

Exemplary, maintenance task t6 needs 3 maintenance personnel, the number of matched personnel of current maintenance set is 1, the maintenance cost score is 0.1, and the preset maintenance set cost threshold range is interval [0.4, 0.5], considering the balance of the ability value and experience value of the three maintenance personnel in the final maintenance set, the maintenance personnel with higher cost scores may be assigned to the maintenance set to generate a plurality of candidate maintenance sets. For example, the cost scores of the other two maintenance personnel m1 and m2 are 0.5 and 0.6 respectively, then the average value $V_{avg}=(0.1+0.5+0.6)/3=0.4$ of the cost scores of the candidate maintenance set. If the average value is within the preset maintenance set cost threshold range, then the matching scores of maintenance personnel m1 and maintenance personnel m2 are relatively high.

It should be noted that when there are a plurality of candidate maintenance personnel satisfying the aforementioned conditions, a plurality of candidate maintenance sets may be generated, and the smart gas safety management platform 130 may sort the average value of the cost scores of a plurality of candidate maintenance sets, and select the candidate maintenance set with the lowest average cost score as the final maintenance set.

In some embodiments, when training the task matching model, the third training sample may also include a plurality sets of sample maintenance set data. The label of each set of third training samples may be a third score label, the third score label may be the matching score of each candidate maintenance personnel for each set of sample maintenance tasks. Exemplarily, the cost scores of the matched maintenance personnel in each sample maintenance set may be evaluated based on the cost scores of each candidate maintenance personnel among the plurality of candidate maintenance personnel and the cost scores of the matched maintenance personnel. The evaluation method may include that, after adding each candidate maintenance personnel into the sample maintenance set, an average value of the final cost scores of the entire sample maintenance set is determined, and when the average value is within cost threshold range of a preset maintenance set, the matching score of each candidate maintenance personnel selected is higher (e.g., the matching score may be set as 0.9 or 0.8), otherwise the matching score is lower (e.g., the matching score may be set as 0.2 or 0.3) to determine the third score label. The third score label may be marked manually or by other ways.

When training the initial task matching model, the smart gas safety management platform 130 may input each set of third training samples with a third score label into the initial task matching model. Through the processing of the initial task matching model, the matching score of each candidate maintenance task and the maintenance personnel may be output. More descriptions of the training method of the task matching model, reference may be found in the training method of the task matching model above, and not be repeated here.

In some embodiments, maintenance personnel may be selected based on a plurality of candidate maintenance tasks displayed on the user terminal, and the smart gas safety management platform 130 may screen a plurality of different candidate maintenance personnel, and the maintenance personnel whose the average value of the cost score of the entire maintenance set satisfy the preset maintenance set cost threshold range are regarded as the final members of the maintenance set. The plurality of candidate maintenance personnel satisfying the aforementioned conditions may be randomly selected, or may be determined based on the chronological order in which the candidate maintenance personnel are selected. The present disclosure does not limit it. It may be understood that considering the wishes of candidate maintenance personnel may make the matching of maintenance tasks more humanized without affecting the completion of the maintenance tasks.

In some embodiments of the present disclosure, by using the maintenance set data as the input of the task matching model, the cooperation, study and guidance between the maintenance personnel may be fully considered, so that the output of the task matching model is more in line with the actual situation and the growth needs of members of the maintenance set.

In some embodiments, the smart gas safety management platform 130 may determine the recommended maintenance tasks for maintenance personnel based on the matching scores determined by the task matching model. Exemplarily, for each candidate maintenance task among a plurality of candidate maintenance tasks, the smart gas safety management platform 130 may sort (e.g., in descending order) the matching scores of all candidate maintenance personnel, and obtain "n" candidate maintenance personnel corresponding to the top "n" matching scores. Furthermore, the candidate maintenance task may be determined as the recommended maintenance task for the n maintenance personnel, n may be a preset number, for example, 2.

In some embodiments, the smart gas safety management platform 130 may determine a maintenance task that meets preset matching conditions as a recommended maintenance task. More descriptions of how to determine the recommended maintenance tasks, reference may be found in FIG. 5 and its description.

In operation 420, pushing the recommended maintenance task to the user terminal of the maintenance personnel.

In some embodiments, the smart gas safety management platform 130 may send the recommended maintenance task to the user terminal of the corresponding maintenance personnel. More description may be found in FIG. 2 and its descriptions.

In some embodiments of the present disclosure, through the matching scores between the maintenance tasks and the maintenance personnel, the recommended tasks of the maintenance personnel may be determined, which helps the determination, distribution and push of the maintenance tasks to be more targeted. In addition, scores may be automatically matched to determined tasks based on the task matching model, the maintenance task information and distance of the maintenance personnel and the maintenance task, maintenance cost, maintenance set, and other factors may be considered, which may help improve the efficiency of determining the maintenance task matching score, and also make the result more accurate and humanized.

Figure 5:
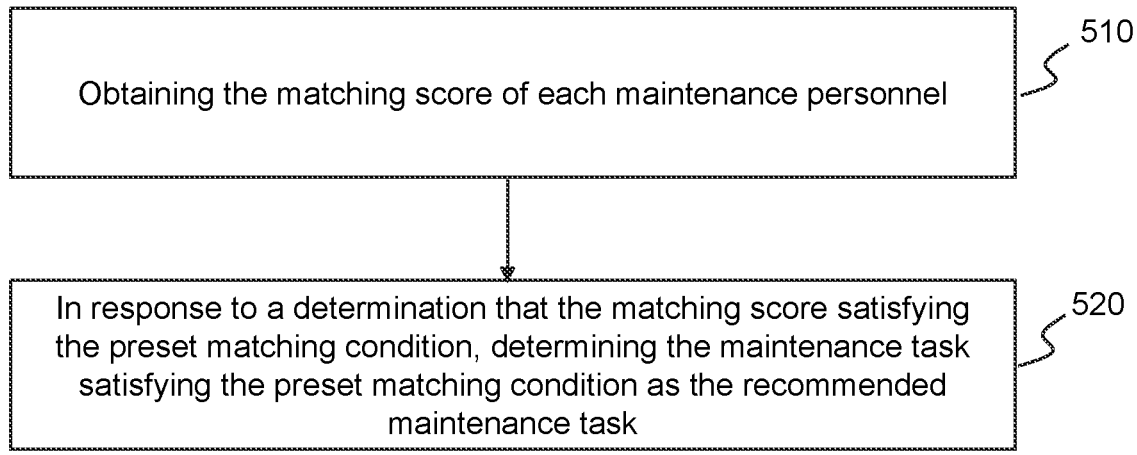
FIG. 5 is another exemplary flowchart of a method for determining a recommended maintenance task of the maintenance personnel according to some embodiments of the present disclosure.

FIG. 5 is another exemplary flowchart of a method for determining a recommended maintenance task of the maintenance personnel according to some embodiments of the present disclosure.

In some embodiments, the process 500 may be executed by the smart gas safety management platform 130. As shown in FIG. 7, the process 500 may include the following operations:

In operation 510, obtaining the matching score of each maintenance personnel.

In some embodiments, the smart gas safety management platform 130 may obtain the matching score between each candidate maintenance task and the maintenance personnel determined based on the task matching model. More descriptions of the task matching model, reference may be found in FIG. 5 and its descriptions.

In operation 520, in response to a determination that the matching score satisfying the preset matching condition, determining the maintenance task satisfying the preset matching condition as the recommended maintenance task.

The preset matching condition may be a condition determined based on various rules, and may be used to determine whether a certain maintenance task is a recommended maintenance task for a certain maintenance personnel.

In some embodiments, for a plurality of candidate maintenance tasks of a certain maintenance personnel, the preset matching condition may be that the matching score is the highest among all candidate maintenance tasks. Exemplarily, the four candidate maintenance tasks for maintenance personnel "m" may be the candidate maintenance task t1, the candidate maintenance task t2, the candidate maintenance task t3, the candidate maintenance task t4, and the matching scores may be 8, 6, 6, and 9, respectively. The matching score of the candidate maintenance task t4 is the highest, and the smart gas safety management platform 130 may determine the candidate maintenance task t4 as the recommended maintenance task for the maintenance personnel "m".

In some embodiments, the preset matching condition may be that the matching score is greater than a preset first threshold. For example, the first threshold may be 6. The first threshold may be determined based on preset rules. For example, the first threshold may be set based on the average maintenance level of the entire maintenance set, the average difficulty of maintenance tasks, etc., and the preset matching condition may be that the matching score is greater than the first threshold. Exemplarily, the first threshold may be 7, and for the aforementioned four candidate maintenance tasks of maintenance personnel "m," the candidate maintenance tasks t1 and t4 with matching scores greater than the first threshold are recommended maintenance tasks for maintenance personnel "m".

The above-mentioned preset matching conditions are only examples, and are not intended to be limiting. For example, when the number of personnel required for a certain maintenance task is one, the preset matching condition may further include: a one-to-one correspondence between the recommended maintenance task and the maintenance personnel.

In some embodiments, the preset matching condition may include a matching score greater than a second threshold, the second threshold is a preset matching score threshold of each maintenance personnel, and the second threshold is related to the historical maintenance data of each maintenance personnel.

The second threshold may be determined based on the actual situation of each maintenance personnel. Different maintenance personnel correspond to different second thresholds. In some embodiments, according to the historical maintenance data of each maintenance personnel, for excellent maintenance personnel with high maintenance experience and ability level, the upper limit of the second threshold may be lowered to expand the matching range of their recommended tasks. For example, the second threshold of the maintenance personnel "m1" is 6, and the maintenance personnel "m2" is better than the maintenance personnel "m1", then the second threshold corresponding to the maintenance personnel "m2" may be a value smaller than 6 (e.g., 5).

In some embodiments of the present disclosure, by determining the second threshold based on the actual conditions such as maintenance experience and ability level of the different maintenance personnel, the recommended maintenance task scope of maintenance personnel with rich experience and high ability level may be expanded, which contribute to more maintenance tasks to have the opportunity to get the participation and guidance of excellent maintenance personnel.

In some embodiments of the present disclosure, by presetting rule conditions, maintenance tasks may be quickly and accurately screened out as recommended maintenance tasks of maintenance personnel based on the matching score.

It should be noted that the above descriptions about the process 200, the process 300, the process 400, and the process 500 are only for illustration and description, and do not limit the scope of application of the present disclosure. For those skilled in the art, various modifications and changes may be made to the process under the guidance of the present disclosure. However, these modifications and changes are still within the scope of the present disclosure.

One of the embodiments of the present disclosure provides a non-transitory computer-readable storage medium storing a set of instructions, when executed by at least one processor, causing the at least one processor to perform the aforementioned management method for the maintenance personnel of smart gas.

It should be noted that the above-mentioned description of the relevant process is only for illustration and description, and does not limit the scope of application of the present disclosure. For those skilled in the art, various modifications and changes may be made to the flow under the guidance of the present disclosure. However, these modifications and changes are still within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been configured to describe embodiments of the present disclosure. For example, the terms "one embodiment," "an embodiment," and/or "some embodiments" mean that a particular feature, structure or feature described in connection with the embodiment is included in at least one embodiment of the present disclosure. Therefore, it is emphasized and should be appreciated that two or more references to "an embodiment," "one embodiment," or "an alternative embodiment" in various portions of the present disclosure are not necessarily all referring to the same embodiment. Furthermore, the particular features, structures or features may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties configured to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present disclosure, the description, definition, and/or the use of the term in the present disclosure shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A management method for maintenance personnel of smart gas, implemented based on a smart gas safety management platform of a management Internet of Things system for maintenance personnel of smart gas, the method comprising:
    obtaining maintenance personnel information of at least one maintenance personnel, the maintenance personnel information including first positioning information of each of the at least one maintenance personnel and historical maintenance data of each of the at least one maintenance personnel;
    obtaining second positioning information corresponding to at least one maintenance task;
    determining a candidate maintenance task based on the first positioning information and the second positioning information; and
    sending the candidate maintenance task to a user terminal of the maintenance personnel;
    determining a matching score between each of the candidate maintenance task and the maintenance personnel through a task matching model based on a distance between the maintenance personnel and each of the candidate maintenance task, task data of each of the candidate maintenance task, the historical maintenance data, a maintenance cost score of each of the at least one maintenance personnel, and maintenance set data, the task matching model being a machine learning model, wherein
    the maintenance cost score is determined through a cost prediction model, the cost prediction model including an embedded layer and a prediction layer; an input of the embedded layer includes the historical maintenance data, and the embedded layer outputs a historical maintenance vector of the maintenance personnel; an input of the prediction layer includes the historical maintenance vector and the task data of the maintenance task, and the prediction layer outputs the maintenance cost score; and the historical maintenance data at least includes feedback information from a customer; and
    the maintenance set data includes a number of maintenance personnel required for each of the at least one maintenance task, a number of the matched maintenance personnel for a current maintenance task, and a maintenance cost score of the matched maintenance personnel;

wherein the embedded layer and the prediction layer are obtained through joint training based on training samples with cost labels, wherein the training samples include historical maintenance data of a plurality of sample maintenance personnels and task data of a plurality of historical sample candidate maintenance tasks, and the cost labels include actual maintenance cost scores of the plurality of the sample maintenance personnels, wherein the joint training includes:

inputting the historical maintenance data of the plurality of the sample maintenance personnels into an initial embedded layer to obtain historical maintenance vectors of the plurality of the maintenance personnels, and inputting the historical maintenance vectors of the plurality of the maintenance personnels and the task data of the plurality of historical sample candidate maintenance tasks into an initial prediction layer to obtain cost scores of the plurality of the maintenance personnels;

constructing a loss function based on the cost labels and outputs of the prediction layer;

iteratively updating parameters of the initial embedded layer and the initial prediction layer based on the loss function until a preset condition is satisfied; and obtaining the embedded layer and the prediction layer;

determining a recommended maintenance task of the maintenance personnel based on the matching score; and pushing the recommended maintenance task to the user terminal of the maintenance personnel.

2. The management method of claim 1, the management Internet of Things system for maintenance personnel of the smart gas further comprising a smart gas user platform, a smart gas service platform, a smart gas sensor network platform, and a smart gas object platform, wherein the smart gas object platform is configured to obtain gas device safety information, and transmit the gas device safety information to the smart gas safety management platform through the smart gas sensor network platform.

3. The management method of claim 2, wherein the smart gas user platform includes a gas user sub-platform and a supervision user sub-platform;

the smart gas service platform includes a smart gas use service sub-platform corresponding to the gas user sub-platform, and a smart supervision service sub-platform corresponding to the supervision user sub-platform;

the smart gas safety management platform includes a smart gas emergency maintenance management sub-platform and a smart gas data center, wherein the smart gas emergency maintenance management sub-platform includes a device safety monitoring management module, a safety alarming management module, a work order dispatch management module, and a material management module;

the smart gas sensor network platform includes a smart gas device sensor network sub-platform and a smart gas maintenance engineering sensor network sub-platform;

the smart gas object platform includes a smart gas device object sub-platform and a smart gas maintenance engineering object sub-platform; and the sending the candidate maintenance task to a user terminal of the maintenance personnel includes:

feeding back the candidate maintenance task of the maintenance personnel to the smart gas maintenance engineering object sub-platform based on the smart gas sensor network platform.

4. The management method of claim 1, wherein the sending the candidate maintenance task to a user terminal of the maintenance personnel comprises:

determining a candidate maintenance personnel corresponding to the candidate maintenance task based on the maintenance cost score; and sending the candidate maintenance task to the user terminal of the candidate maintenance personnel.

5. The management method of claim 1, wherein the determining the recommended maintenance task of the maintenance personnel based on the matching score comprises:

in response to a determination that the matching score satisfies a preset matching condition, determining the maintenance task satisfying the preset matching condition as the recommended maintenance task.

6. A non-transitory computer-readable storage medium storing a set of instructions, when executed by at least one processor, causing the at least one processor to perform the management method for the maintenance personnel of smart gas of claim 1.

7. A management Internet of Things system for maintenance personnel of smart gas, comprising: a smart gas user platform, a smart gas service platform, a smart gas safety management platform, a smart gas sensor network platform, a smart gas object platform, wherein the system further comprises a non-transitory storage medium storing a set of instructions, and at least one processor in communicate with the non-transitory storage medium, wherein when executing the set of instructions, the at least one processor is configured to cause the system to:

obtain gas device safety information, and transmit the gas device safety information to the smart gas safety management platform through the smart gas sensor network platform based on the smart gas object platform; and obtain maintenance personnel information of at least one maintenance personnel based on the smart gas safety management platform, the maintenance personnel information including first positioning information of each of the at least one maintenance personnel and historical maintenance data of each of the at least one maintenance personnel;

obtain second positioning information corresponding to at least one maintenance task;

determine a candidate maintenance task based on the first positioning information and the second positioning information;

send the candidate maintenance task to a user terminal of the maintenance personnel;

determine a matching score between each of the candidate maintenance task and the maintenance personnel through a task matching model based on a distance between the maintenance personnel and each of the candidate maintenance task, task data of each of the candidate maintenance task, the historical maintenance data, a maintenance cost score of each of the at least one maintenance personnel, and maintenance set data, the task matching model being a machine learning model, wherein the maintenance cost score is determined through a cost prediction model, the cost prediction model including an embedded layer and a prediction layer; an input of the embedded layer includes the historical maintenance data, and the embedded layer outputs a historical maintenance vector of the maintenance personnel; an input of the prediction layer includes the historical maintenance vector and the task data of the maintenance task, and the prediction layer outputs the maintenance cost score; and the historical maintenance data at least includes feedback information from a customer; and the maintenance set data includes a number of maintenance personnel required for each of the at least one maintenance task, a number of the matched maintenance personnel for a current maintenance task, and a maintenance cost score of the matched maintenance personnel;

wherein the embedded layer and the prediction layer are obtained through joint training based on training samples with cost labels, wherein the training samples include historical maintenance data of a plurality of sample maintenance personnels and task data of a plurality of historical sample candidate maintenance tasks, and the cost labels include actual maintenance cost scores of the plurality of the sample maintenance personnels, wherein the joint training includes:

inputting the historical maintenance data of the plurality of the sample maintenance personnels into an initial embedded layer to obtain historical maintenance vectors of the plurality of the maintenance personnels, and inputting the historical maintenance vectors of the plurality of the maintenance personnels and the task data of the plurality of historical sample candidate maintenance tasks into an initial prediction layer to obtain cost scores of the plurality of the maintenance personnels;

constructing a loss function based on the cost labels and outputs of the prediction layer;

iteratively updating parameters of the initial embedded layer and the initial prediction layer based on the loss function until a preset condition is satisfied; and obtaining a trained embedded layer and a trained prediction layer;

determine a recommended maintenance task of the maintenance personnel based on the matching score; and push the recommended maintenance task to the user terminal of the maintenance personnel.

8. The management Internet of Things system of claim 7, wherein the smart gas user platform includes a gas user sub-platform and a supervision user sub-platform;

the smart gas service platform includes a smart gas use service sub-platform corresponding to the gas user sub-platform and a smart supervision service sub-platform corresponding to the supervision user sub-platform;

the smart gas safety management platform includes a smart gas emergency maintenance management sub-platform and a smart gas data center, wherein the smart gas emergency maintenance management sub-platform includes a device safety monitoring management module, a safety alarming management module, a work order dispatch management module, and a material management module;

the smart gas sensor network platform includes a smart gas device sensor network sub-platform and a smart gas maintenance engineering sensor network sub-platform; and the smart gas object platform includes a smart gas device object sub-platform and a smart gas maintenance engineering object sub-platform;

wherein to send the candidate maintenance task to a user terminal of the maintenance personnel, the smart gas safety management platform is further configured to:

feed back the candidate maintenance task of the maintenance personnel to the smart gas maintenance engineering object sub-platform based on the smart gas sensor network platform.

* * * * *